United States Patent
Cowan et al.

(10) Patent No.: US 8,095,612 B2
(45) Date of Patent: Jan. 10, 2012

(54) RANKING MESSAGES IN AN ELECTRONIC MESSAGING ENVIRONMENT

(75) Inventors: David Cowan, Atherton, CA (US); Ethan Kurzweil, San Francisco, CA (US); James Cham, Mountain View, CA (US)

(73) Assignee: MailRank, Inc., Menlo Park, CA (US)

( * ) Notice: Subject to any disclaimer, the term of this patent is extended or adjusted under 35 U.S.C. 154(b) by 151 days.

(21) Appl. No.: 12/562,472

(22) Filed: Sep. 18, 2009

(65) Prior Publication Data

US 2010/0077041 A1    Mar. 25, 2010

Related U.S. Application Data

(60) Provisional application No. 61/098,452, filed on Sep. 19, 2008.

(51) Int. Cl.
*G06F 15/16* (2006.01)
(52) U.S. Cl. ......................... 709/207; 709/206
(58) Field of Classification Search .......... 709/206–207, 709/223–224
See application file for complete search history.

(56) References Cited

U.S. PATENT DOCUMENTS

| | | | | |
|---|---|---|---|---|
| 6,816,863 | B2 * | 11/2004 | Bates et al. | 1/1 |
| 6,985,926 | B1 * | 1/2006 | Ferlauto et al. | 709/206 |
| 7,428,579 | B2 * | 9/2008 | Libbey et al. | 709/206 |
| 7,565,403 | B2 * | 7/2009 | Horvitz et al. | 709/206 |
| 7,634,528 | B2 * | 12/2009 | Horvitz et al. | 709/200 |
| 7,890,596 | B2 * | 2/2011 | Guy | 709/207 |
| 2002/0133557 | A1 | 9/2002 | Winarski | |
| 2004/0117326 | A1 | 6/2004 | Amato | |
| 2004/0177110 | A1 | 9/2004 | Rounthwaite et al. | |
| 2005/0267944 | A1 * | 12/2005 | Little, II | 709/207 |
| 2006/0195533 | A1 * | 8/2006 | Isozaki et al. | 709/206 |
| 2007/0036301 | A1 | 2/2007 | Voticky et al. | |
| 2008/0005249 | A1 * | 1/2008 | Hart | 709/206 |

* cited by examiner

*Primary Examiner* — Hussein A. Elchanti
(74) *Attorney, Agent, or Firm* — Fenwick & West LLP

(57) ABSTRACT

The present invention provides methods and systems to score messages exchanged over a network. The methods and systems may gather message interactions of a recipient. A message originating from a sender and destined for the recipient may be received at an email client. A sender score of the message may be determined based on one or more of sender information, the gathered message interactions, and one or more attributes associated with the message. The message may be marked with the determined score in a user interface associated with the email client.

21 Claims, 5 Drawing Sheets

RANKING MESSAGES IN AN ELECTRONIC MESSAGING ENVIRONMENT

CROSS-REFERENCE TO RELATED APPLICATIONS

This application claims the benefit of the following provisional application, which is hereby incorporated by reference in its entirety: U.S. Ser. No. 61/098,452, filed Sep. 19, 2008.

BACKGROUND OF THE INVENTION

1. Field of the Invention

The invention generally relates to methods and systems for ranking of messages based on user's interaction with one or more messages; more specifically, to methods and systems for improving the usability of emails by attaching a score to each message based at least in part on its relevancy to the user.

2. Description of the Related Art

In recent times, the Internet has become an important medium for collaboration and exchange of information among users. Corporate bodies are increasingly using the Internet for exchanging information through exchange portals, collaboration platforms, etc. Use of emails, in particular, has become voluminous. This has led to the added use of emails as a means of advertising by organizations, individuals, corporate houses, and businesses.

While the exchange of emails is useful, users often find their mailbox filled with emails that are irrelevant or junk. A study conducted by the RADICATI GROUP™ estimated that a user on an average received 156 emails per day in 2008. This number is expected to grow to 233 emails per day in 2012. Scanning of such large volumes of emails requires a lot of time and effort with users spending a couple of hours several times over a day in an effort to organize the email data. A need is therefore felt for a system that automatically organizes the user's messages according to the relevancy of the message.

SUMMARY OF THE INVENTION

The present invention provides methods and systems to score or rate messages exchanged over a network. The methods and systems may gather message interactions of a recipient. A message originating from a sender and destined for the recipient may be received at an email client. A sender score of the message may be determined based on one or more of sender information, the gathered message interactions, and one or more attributes associated with the message. The message may be marked with the determined score in a user interface associated with the email client.

In embodiments, gathering the interactions of the recipient may include gathering a response of the recipient to the message and responses of the recipient to other messages as well.

In embodiments, the attributes used to determine the score of the message might be a number of recipients for the message, a priority of the message, time of the message, and a subject of the message. In embodiments, the sender information may be a recipient-defined score of the sender. In embodiments, the sender information may be a predetermined score of the sender. In embodiments, the sender may be an unknown user or a known user.

Further, the sender score may be determined based on a transitive ITM, a recursive percentile of the sender's influence, a SWAY, a corporate administrator input, a feedback from the recipient on the sender score, and determination of 'To,' 'Cc' and 'Bcc' fields in the received message.

In embodiments, the sender score may be determined based on frequency and recentness of the gathered message interactions. The frequency of the interactions may be an open email rate, a reply email rate, a delete email rate, a rate of clicking of hyperlinks, a rate of download of graphs, and a filing or archiving rate.

In embodiments, all subsequent messages that originate from the sender may be allocated the score determined for the sender using any of the above parameters. These messages may be marked with their determined scores and displayed to the recipient.

In embodiments, the systems and methods for scoring messages exchanged over a network may be provided. The system may include an email client that exchanges email messages and gathers interactions of a recipient with different senders of messages. In embodiments, the email client may receive a message from a sender. The system may further include a ranking server that determines a sender score of the message based on one or more of sender information, the gathered message interactions, and one or more message attributes. Further, the ranking server may send the determined score to the email client to be presented along with the message.

These and other systems, methods, objects, features, and advantages of the present invention will be apparent to those skilled in the art from the following detailed description of the preferred embodiment and the drawings. All documents mentioned herein are hereby incorporated in their entirety by reference.

DETAILED DESCRIPTION OF THE PREFERRED EMBODIMENT(S)

Figure 1:
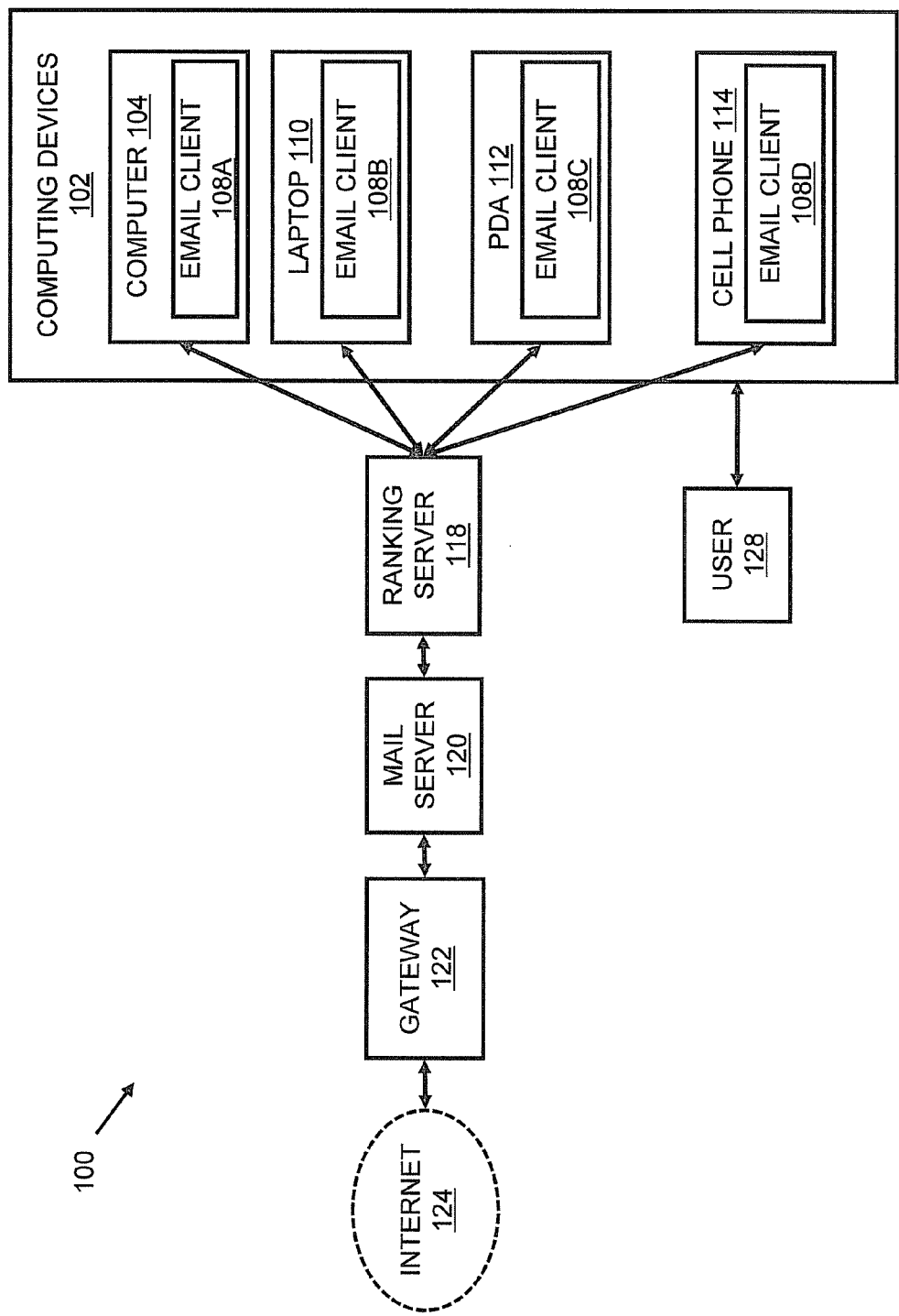
FIG. 1 depicts an operating environment of a mail ranking system in which various embodiments of the present invention may be practiced.

While the specification concludes with the claims defining the features of the invention that are regarded as novel, it is believed that the invention will be better understood from a consideration of the following descriptions in conjunction with the drawings/figures, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms "a" or "an," as used herein, are defined as one or more than one. The term "another," as used herein, is defined as at least a second or more. The terms "including" and/or "having" as used herein, are defined as comprising (i.e. open transition). The term "coupled" or "operatively coupled" as used herein, is defined as connected, although not necessarily directly, and not necessarily mechanically.

FIG. 1 illustrates a system 100 having hardware and an operating environment with which various embodiments of the present invention may be practiced. The system 100 may include a plurality of computing devices 102. The computing devices 102 may include a computer 104, a laptop 110, a PDA 112 and a cell phone 114 in addition to other types of computing devices. An email client may be provided in the different computing devices 102. For example, an email client 108A may be provided in the computer 104, which may be configured to send and receive messages on behalf of a user 128. Similarly, email clients 108B, 108C, and 108D may be provided related to the laptop 110, the PDA 112, and the cell phone 114, respectively. The email clients 108 associated with the computing devices 102 such as the computer 104, the laptop 110, the PDA 112 and the cell phone 114 may communicate with a ranking server 118 in order to send/receive messages such as emails associated with a particular user. The ranking server 118 may be a web server, a file server, an email server or some other type of server. In embodiments, the ranking server 118 may a special kind of server implementing algorithm for ranking of messages requiring a special kind of hardware and/or software. Additionally, the ranking server 118 may be communicate with a mail server 120 and the email clients 108 to access messages as they are sent and received. The ranking server 118 may communicate with the email clients 108 to learn a user's action regarding the messages.

In embodiments, the mail server 120 may be coupled to the ranking server 118 that may implement algorithms for ranking of messages received from the mail server 120. Alternatively, the ranking server 118 and the mail server 120 may be integrated into a single hardware thus providing both the functionality of ranking messages and managing email clients such as 108.

Figure 2:
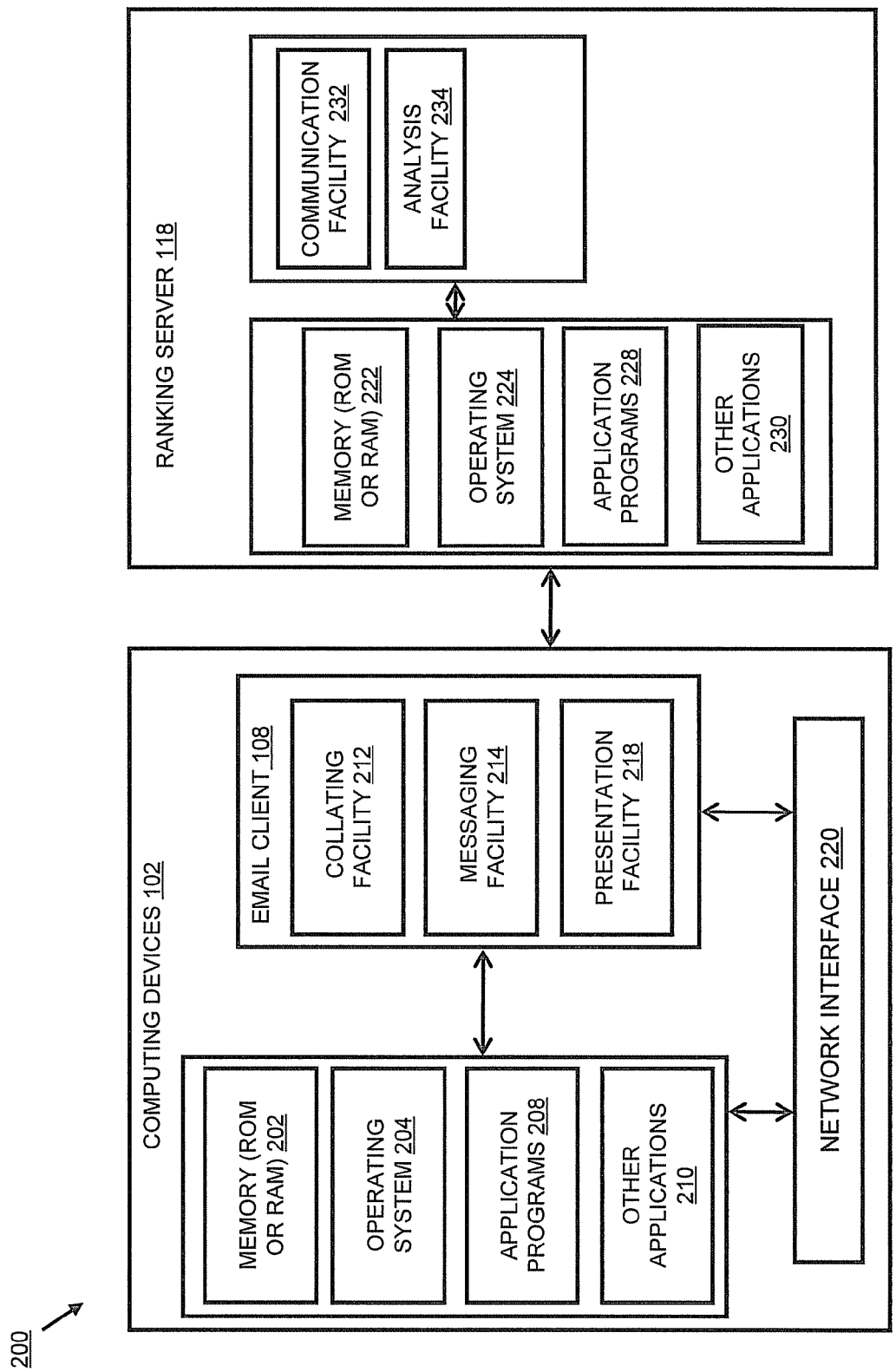
FIG. 2 depicts various computing system components that may be used in the invention.

In FIG. 2, various hardware and software components associated with the computing devices 102 and the ranking server 118 are illustrated. Each of the computing devices such as the computer 104 may include, apart from other things, a memory 202, an operating system 204, application programs 208 and other applications 210. It may be noted that standard hardware such as a processor, I/O devices and other components may be a part of the computing device 102 as know in the art.

The computer 104 may enable the user 128 (i.e., recipient) to access the email client 108 in FIG. 2 and view all received messages from other users (i.e., senders). Likewise, the user 128 may send messages to another user A. In this case, the user 128 will act as a sender and the user A will act as a recipient. In order to implement the systems and methods of the present invention at the end of user A, an email client similar to the email client 108 may be installed at the end of user X. The email client 108 in FIG. 2 may include a collating facility 212, a messaging facility 214 and a presentation facility 218. Messages received from other users may be collated based on different criteria including sender, type, subject, recipient group and the like at the collating facility 212. The messaging facility 214 may facilitate the delivery of outgoing messages and receipt of incoming messages to the ranking server 118. Furthermore, the messaging facility 214 may be coupled to a network interface 220 for exchanging information with other devices such as the ranking server 118, the mail server 120 and the Internet 124. It may be noted that the ranking server 118 may adjust one or more fields associated with standard email exchange protocols to communicate a rank to the email client. Standard protocols, such as Point-to-Point Protocol (PPP), IMAP, and Simple Mail Transfer Protocol (SMTP) and the like are contemplated herein. In an example, the IMAP protocol includes a "category" field that may be used by the ranking server 118 to communicate the rank to the email client plug-in software so that the rank may be displayed by the email client.

The messaging facility 214 associated with the email client 108 as shown in FIG. 2 may perform a plurality of tasks including extracting scores associated with outgoing messages and providing them to the ranking server 118. These scores may be utilized for computing new scores for the email address so that subsequent messages (hereinafter interchangeably referred to as 'second set of messages' from the same email address may be associated with the new scores. Any of the collating facility 212, the messaging facility 214, the presentation facility 218 or any combination or sub-portion thereof may be configured as a plug-in that can be installed to work cooperatively with the email client 108, such as to provide an integrated interface that conforms with the native interface of the email client 108.

The ranking server 118 may include a memory 222, an operating system 224, application programs 228, other application programs 228, and other applications 230. Additionally, the ranking server 118 may be configured to implement the algorithms for ranking of messages received by a communication facility 232. The communication facility 232 may be associated with an analysis facility 234. Analysis of emails may be performed by aggregating the emails from all the email clients such as the computer 104, the laptop 110, the PDA 112 and the cellphone 114 related to the ranking server 118. The analysis facility 234 may execute ranking of algorithms and/or sets of rules for ranking the messages received from all email clients 108. The rank may be in the form of a score, an attribute, a numeric value or some other type of parameter or meta-data. These scores may be assigned for each user 128 for a definite time period. The time period may be a day, a week, a month or some other type of time period. In addition, these scores may change over time according to a decay factor that may be predefined, user defined, automatically determined, and the like.

In embodiments, the ranking server 118 may compute ranks for each message associated with the email client 108 and may provide a score to it. As described herein and elsewhere, the ranking server 118 may aggregate messages from different email clients 108 and accumulate them in one place. Subsequently, each message may be analyzed by the analysis facility 234 to obtain a score. For example, X1 represents a first user and may have an email address E1; similarly, X2 corresponds to a second user with an email address E2; likewise, a third user X3 may have an email address E3. The first user X1 may exchange messages with the second user X2 and the third user X3; based on this exchange, the ranking server 118 may determine a score for users X2 and X3 and assign these scores to the email address E2 of the second user X2 and the email address E3 of the third user X3, respectively. Likewise, the second user X2 may exchange messages with the first user X1 thus assigning a score to the first user X1 (email address E1). Even though X3 does not communicate with the first user X1 or the second user X2, the third user X3 may still have a score associated with it based on the messages exchanged with X1 and X2.

Initially, one or more new/unknown users, who are exchanging messages with the existing/known user, may be provided with a score. This score may be computed based on the interaction of the new user with the existing users. Thus, one or more new users may have a 'cold start,' and subsequently as they exchange messages with the other existing users, a score may be determined and assigned to these new users, who eventually integrate with the existing users. The ranking sever 118 may dynamically update the score for each user after each interaction based on a predetermined algorithm and/or on a fixed rule. In embodiments, the interaction of the user may be a user's response to a received message. In embodiments, the interaction of the user may be a history of responses of the user to messages (i.e., hereinafter interchangeably referred to as other messages) that were received by the user previously.

An algorithm for determining a rank may measure how quickly a user performs certain actions on a message and correlates this measure to determine importance of the message to that specific user. For each email address, a global parameter know as SWAY that measures a global importance of each email address and may represent an influence across all measured instances of an email address. SWAY may be a measure of a quantity of influence weighted by the strength of the influence, discounting all points of influence that do not reach a minimal importance threshold level (e.g., 30% importance). In an example, SWAY may be calculated by taking a value of importance of a first email address (or first user) to others (50% to user 2, 90% to user 3, 1% to user 4), and for each value above the importance threshold (e.g. 30%) weighting the value by the other users SWAY and summing the weighted values to produce a tally. The tally is then converted to SWAY by representing the tally as a percentile of all tallies calculated for all users. SWAY may be calculated each time a message is ranked, may be calculated when certain messages are ranked, may be calculated from time to time, and the like. A new user may be assigned a default SWAY.

SWAY may be important because (i) it accounts for quality through the importance of a first user to other users as well as the importance of the other users to others, (ii) it discounts noise from spammers who might otherwise game the system by accumulating bits of SWAY, and (iii) it distributes all the tallies linearly from 0 to 100 by representing the answer in terms of a percentile, so that it can depict real variance in the results (e.g. a tally difference of only 5% can yield a SWAY difference of 20 percentile).

In embodiments, the sender information may be a user-defined score of the sender. In this case, all messages received from this sender may be provided with the user-defined score. In embodiments, the sender information may be a predetermined score for the sender. The ranking server 118 may have earlier determined a score of high/low/medium for sender X (or ranked sender X on a scale of 1 to 5) for an email that is received from sender X and destined for the user. Now, when sender X sends another email to the same user, the ranking server 118 may attach this pre-determined score to the email and deliver it to the email client 108.

In embodiments, the plurality of parameters utilized by the ranking server 118 may include the recipient address (i.e., the recipient marked in the 'To' field of the email), the addresses of recipients who are copied in the email (i.e., the recipients marked in the 'CC' field of the email), the addresses of the recipients who have been marked in BCC, number of recipients, priority attached with the message, time of sending/receiving the message, content in the subject field of the message, sender score (i.e., sender information), and sender's ITM (Importance To Me), subject ITM, and the like. For example, if the first user X1 marks the priority of the message as high before sending this message to a second user X2, the ranking sever 118 may increase the score of the first user X1 which may increase the message rank.

Similarly, if the subject line of the message sent by a user is determined to be the same as or sufficiently similar to other messages that have received a high rank, the ranking server 118 may increase the score of the sender. Furthermore, these parameters may also be used to increase the authenticity of the recipient, if the sender is an authentic source. In embodiments, the score of the recipient may also be increased using any of the parameters described herein.

The ranking server 118 may examine a message subject to distinguish potentially important messages from potentially less important messages. An example of such a distinction includes determining the importance of a first message with "There is a problem with your order" as the subject compared a second message with "Thank you for your order" as the subject. In the example, the first message may be assigned a higher score than the second message because the second message may be of a more informational nature than the first message.

In embodiments, the sender score may be a function of the frequency of user's action on the received message. For example, if the user frequently (or always) deletes the email messages received from a sender X, then the score of the sender X may be reduced. Alternatively, if the user frequently (or always) replies to one or more email messages received from a sender Y, then the score of the sender Y may be increased. In other embodiments, the sender score may be a function of the recentness of the received message. The frequency of the user's action may include an open email rate, a reply email rate, a delete email rate, rate of click-through of the hyperlinks received in an email, rate of download of the graphics, filing or archiving rate, and the like. For example, a prompt action by the first user X1 on the received email may increase the rank of the message and therefore of the sender's importance to me (ITM). This may also impact the sender's global SWAY because individual ITM values impact global SWAY. Likewise, if the second user X2 regularly deletes the email from a particular receipt, the authenticity of the sender falls and finally the user may be classified a spammer.

In embodiments, the user 128 may add different personalization features by altering the set rules that decide the score. The user 128 may define a threshold score; this score may be utilized in deciding whether the message may be spam or non-spam. For example, the user 128 may consider software update information from a particular organization to be spam and may therefore define a much higher cut-off score for such messages to indicate this.

In embodiments, the ranking server 118 may be highly scalable thus allowing personalization for each user. The algorithm implemented on the ranking server 118 may be configured to provide computational ability in view of the high volume of traffic, messages and the like. Furthermore, the ranking server 118 may be capable of optimizing the usage of memory such as RAM, flash memory, virtual memory for creation of plurality of data structures including stacks, trees, graphs, linked list and the like. Furthermore, the memory management scheme may be altered to facilitate the optimization of the memory scheme. In embodiments, the ranking server 118 may utilize the same memory management scheme as provided by the server software and/or the techniques well known in the art.

In embodiments, the ranking server 118 may be capable of calculating the score based on the participation of a subset of users. As described above, the subset of users may exchange messages with other non-participating users; since the score for each user may be computed on the total number of message exchanges with the subset of participating users, the score for the non-participating users may still be updated.

In another embodiment, the ranking server 118 may be configured with the mail server 120 thus reducing the load. In this scenario, the mail server 120 may be relieved of the process of identifying some spam emails because the ranking server 118 would already have given the spam email a low rank. Further, a plurality of servers may be utilized for distributing the load and thus creating a server farm or server cluster.

Figure 3:
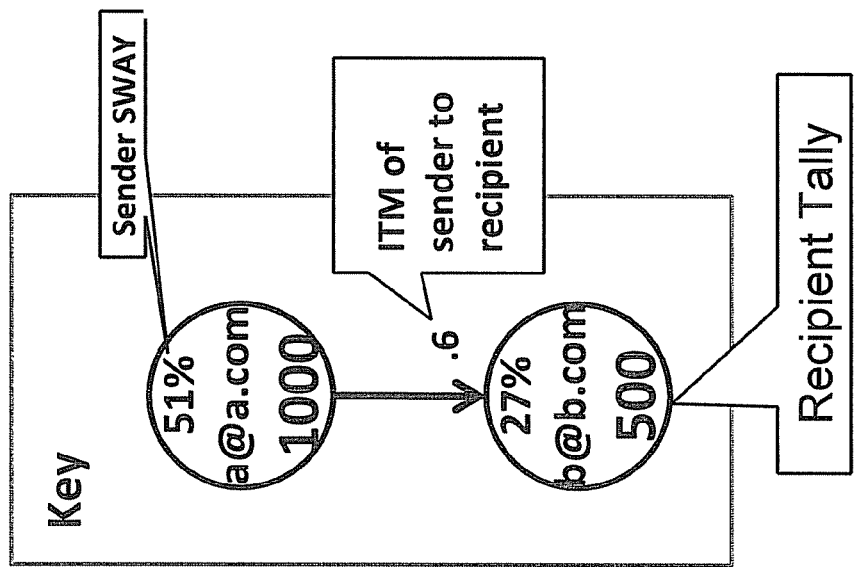
FIG. 3 depicts interactions among users for determining message rank and sender score.
Figure 3:
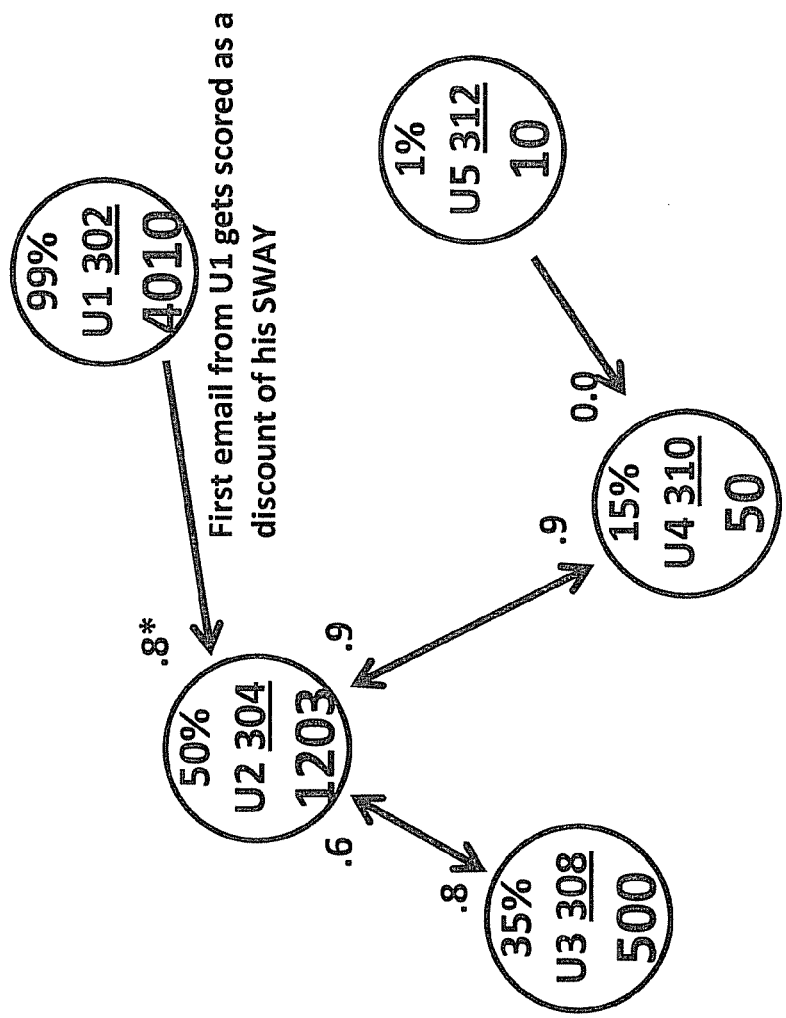

Referring to FIG. 3, a graph of user interactions along with SWAY, ITM, and TALLY for the users depicts elements used to compute the score associated with each user. As shown in FIG. 3, U1 302, U2 304, U3 308, U4 310 and U5 312 each represent a user and data corresponding a rank. It may be appreciated that the number of users shown in FIG. 3 are exemplary, and the number may increase or decrease depending upon the actual number of users. In order to calculate the score for each user, community interaction of the user with other users may be gathered and recorded. In embodiments, the email client 108 may monitor (and hence gather) a user interactions with the other users. Thus, if U1 302 is initially considered as an authentic user, then an exchange of messages with other users as shown in FIG. 3 may increase the score of U2 304 and U3 308. Similarly, the analysis facility 234 may decrease the score of the user represented by user data U5 312 if the messages originating from this user are continuously deleted by other users. In an example, users whose messages are responded to quickly by a recipient (e.g. a user's boss, wife, and the like) may be more important to the recipient and therefore may get a higher I™ from the recipient. Because ITM impacts SWAY, SWAY for the sending users in this example may also be increased.

Figure 4:
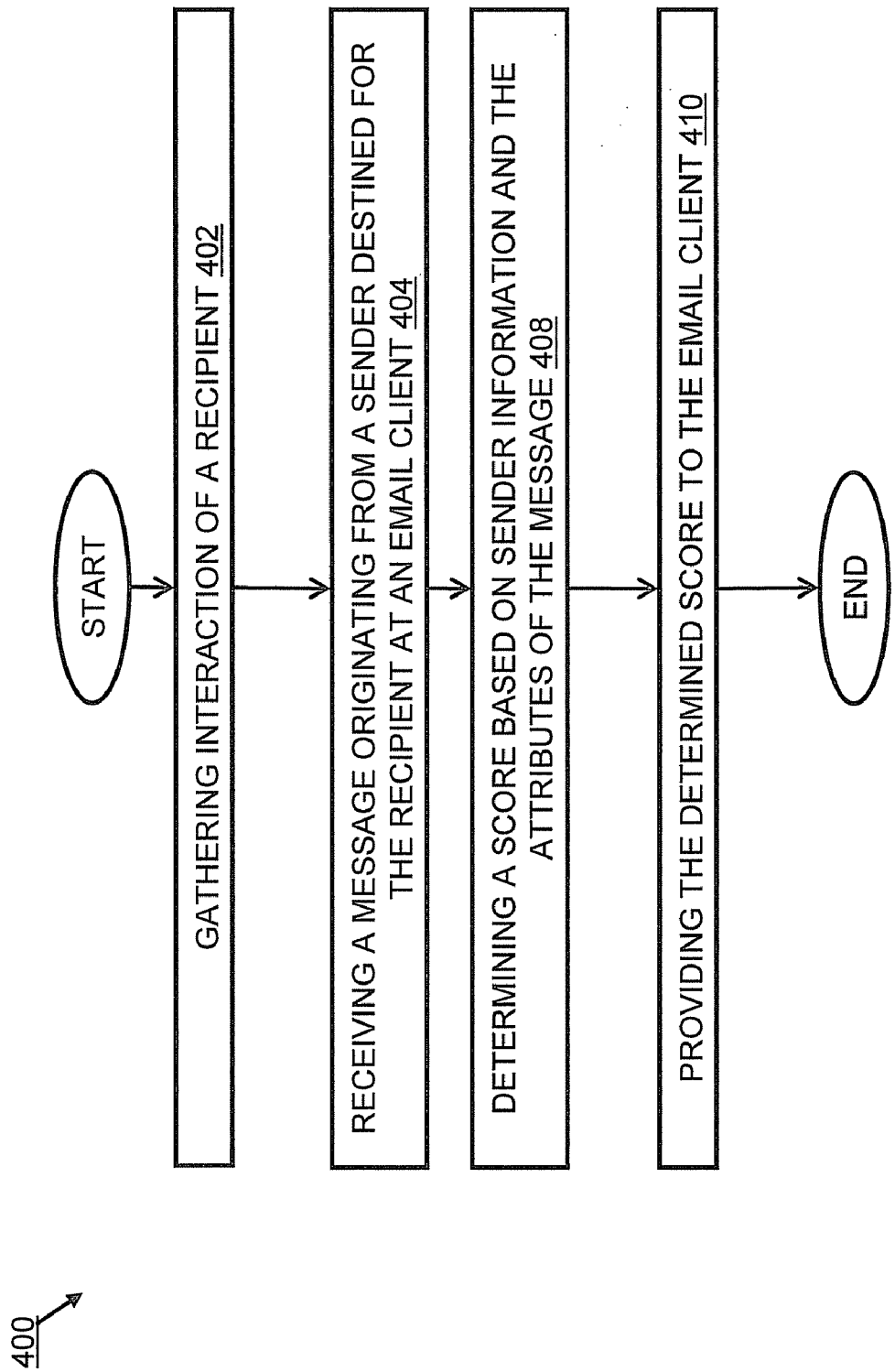
FIG. 4 depicts a flowchart for determining a score in accordance with an embodiment of the present invention.

Referring to FIG. 4, the process 400 for ranking messages may be implemented in the memory of the ranking server 118. The process 400 may be initiated by creating a data structure such as graph, linked list, tree and the like for all the users. It may be noted that the ranking server 118 may be a specialized server with memories for creating data structures of large sizes. At step 402, the process 400 may identify the email address of each user and the score associated with it and gather the interaction of a recipient with the community. A message, destined for the recipient, may be received from a sender at the email client at step 404. This message may be forwarded to the ranking server 118 in order to update the score of the sender and prepare a rank for the message. At step 408, the ranking server may determine the new score of the sender and prepare a rank for the message based on sender information and the attributes of the received message. Each message from a sender may receive a different rank based on the contents of the message, the subject line, or other attributes of the received message. The score may be provided to the email client 108 at step 410. Finally, the email client 108 may display the received message along with the score of the received message at a user interface associated with the email client 108. In embodiments, the email client 108 may mark the message with the determined score, and then display it at the user interface. It will be apparent to a person skilled in the art that the score may be displayed along with the message at the user interface using any other known techniques or third party email client interfaces. In addition, the user may control the display of the messages based on the rank or score provided therewith. In an example, the user may choose to display only messages with a rank score above 80.

Figure 5:
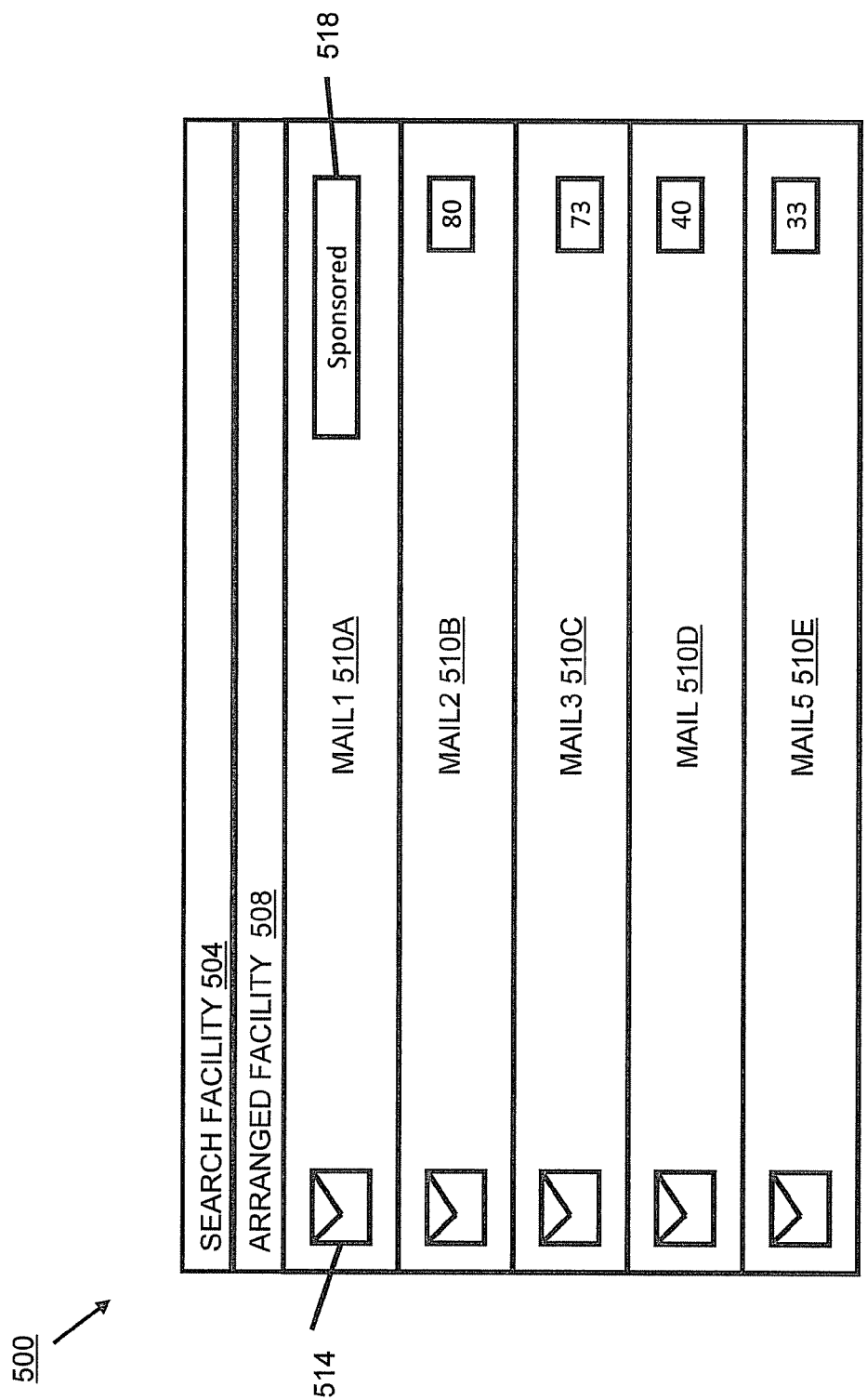
FIG. 5 depicts a user interface in accordance with an embodiment of the present invention.

Referring to FIG. 5, a user interface 500 at the email client 108 is illustrated. The user interface 500 may include a search facility 504, an arrangement facility 508, plurality of emails 510, an indicator for read 514 and a score 518 provided from the ranking server 118. The read indicator 514 may indicate if the email has been read by the recipient/user 128. Similarly, the score 518 may provide the score associated with a particular email. The score may be obtained from the ranking server 118.

The arrangement facility 508 may provide the arrangement of emails by name, type, date and the like. Likewise, the search facility 504 may facilitate searching of emails received by the user 128. The user interface 500 may be any third party email user interface such as those provided from MICROSOFT, GOOGLE, YAHOO, and the like.

In embodiments, the ranking server 118 may be freely available to all the users. The ranking server may enable providing scores to each in order to facilitate a user separating the important emails from non-important emails. In embodiments, the ranking server may allow the user 128 to personalize the criteria for identification of important emails and non-important emails by initially defining the rules in the ranking algorithm. For example, the user 128 may input the most trusted email address as a starting point for execution of the ranking algorithm for personalization of scores. Alternatively, the user may define one or more spam email addresses for ranking these email recipients very low.

In embodiments, the user 128 may operate the ranking server 118 with email services/accounts provided by YAHOO, HOTMAIL, GMAIL and the like. The user 128 may configure the email service accounts by registering with the ranking server 118 through a web interface. For example, the user 128 may access a registration page of the ranking server 128 and register his/her email accounts and addresses for availing the ranking/scoring of emails. The user 128 may then utilize scoring/ranking of email.

In embodiments, the ranking server 118 may be configured into the email account of the user 128 such as Yahoo, Hotmail Gmail and the like. The user may access the corresponding tab/checkbox/link and the like, and initialize it for ranking/scoring emails. For example, the tab may appear in the welcome page of the email recipient; the email recipient may click on the tab to initialize the ranking server 118 and thereafter receive emails with ranks/scores.

In embodiments, a web interface may be provided to the user 128; the user may visit the web interface to register with the ranking server 118. The web interface may be a webpage, a web client, an application program that interfaces with the ranking server 118 or some other type of web interface. For example, the user 128 may visit the webpage and register with the ranking server 118 by filling in the required details. Subsequently, the user 128 may start receiving emails with scores indicating the relative importance of the emails. In may be noted that such a registration may be free for any number of email addresses that the user may want to subscribe to. Alternatively, the user 128 may pay for one or more email addresses depending upon the categorizations of the user 128. For example, if the user 128 is a student, the service may be provided free; for a professional, the registration may attract a nominal registration fee.

In embodiments, user 128 may configure a plug-in, which may allow the user 128 to configure the ranking server 118 with the email clients such as MS OUTLOOK, EUDORA and the like. The plug-in may facilitate personalization of the scores by modification of the initial condition of the ranking algorithm. Additionally, the plug-in may also allow configuration of VoIP call that may be received by the recipient, and based on the identification of the called number, the ranking server 118 may score the calls.

In embodiments, a software utility in cell phone 114 may be provided for ranking/scoring emails. For example, a software utility may be configured into an IPHONE that may be integrated to the ranking server 118, which may provide a score to the received emails at the recipient terminal. Such a service may be availed by registering at a website. Registration may allow the user 128 to download and integrate a ranking app into the IPHONE. Alternatively, such a plug-in may be bundled with the phone software and may be initialized by registering for that service. In embodiments, the software utility may be free or paid.

In embodiments, the ranking server 118 may be integrated into the corporate network connected to a corporate email server. Alternatively, the ranking server 118 may be integrated at the Internet Service Provider in order to provide ranking of emails.

In embodiments, the ranking server 118 may facilitate product promotion or advertising for products and services. The marketers may register with the ranking server 118. The ranking server 118 may provide high score for promotional emails sent by the registered marketers to the recipient. Subsequently, all the promotional/advertising/product and/or service trial emails delivered to the recipient's inbox may be accumulated together because of the same score/ranking. For example, an email from a registered advertiser relating to a free product trial may be given a score of 100, or an exceptional score such as "SPONSORED". The email recipient may respond to this promotional/product trial email and in response an amount may be debited from the advertisers account for each response. The advertiser may be debited on one or more criteria including pay-per-click, successful download of the trial software, clicking on the download link, receiving a read receipt from the recipient, clicking on the email or some other type of criteria. In this way, a facilitator of the mail ranking invention may monetize its use.

In embodiments, the ranking server 118 may optimize the score based on the history of prior clicks made on the promotional emails; the ranking server may then identify users that are likely to initiate action on promotional emails based on their past history. Scores for each user may be maintained at the ranking server 118 corresponding to each registered advertiser. In this scenario, the ranking server 118 may identify a list of such users for sending promotional emails. This would increase the likelihood of a high degree of responses.

In embodiments, the email messages may be a more authentic form of promotion since the emails may be saved and may be accessed later. Furthermore, searches may be performed on the saved emails; the email may also be forwarded to other trusted users actively searching for a particular product and/or service trial.

The methods and systems described herein may be deployed in part or in whole through a machine that executes computer software, program codes, and/or instructions on a processor. The processor may be part of a server, client, network infrastructure, mobile computing platform, stationary computing platform, or other computing platforms. A processor may be any kind of computational or processing device capable of executing program instructions, codes, binary instructions and the like. The processor may be or may include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered a part of the infrastructure associated with the server.

The server may provide an interface with other devices including, without limitation, clients, other servers, printers, database servers, print servers, file servers, communication servers, distributed servers and the like. Additionally, this coupling and/or connection may facilitate remote execution of a program across the network. The networking of some or all of these devices may facilitate parallel processing of a program or method at one or more location without deviating from the scope of the invention. In addition, all the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, all the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law All documents referenced herein are hereby incorporated by reference.

The invention claimed is:

1. A method comprising:
    identifying message interactions of a plurality of recipients for a plurality of messages, the messages from a plurality of senders;
    determining for each of the senders, a measure of importance of the sender to each recipient of a message from the sender, based upon the gathered interactions;
    determining for each of the plurality of senders a global importance score, wherein the global importance score of each sender is based upon the determined measure of importance of the sender to each of the plurality of recipients of messages from the sender, and a global importance score of each of the plurality of recipients of messages from the sender;
    receiving from one of the senders, a message destined for at least one of the recipients; and
    associating the message with a rank based upon the determined global importance score of the sender.

2. The method of claim 1, further comprising forwarding the associated message to the at least one recipient.

3. The method of claim 1, wherein identifying the message interaction of a recipient comprises identifying at least one of:
    the responses of the recipient to a plurality of messages from a plurality of senders;
    feedback from the recipient on the measure of importance of the sender to the recipient;
    feedback from the recipient on the global importance score of the sender; and
    the attributes of the message.

4. The method of claim 1, wherein the measure of importance of the sender to each recipient is based on frequency and recency of the identified message interactions.

5. The method of claim 1, wherein the measure of importance of the sender is set to a predetermined value.

6. The method of claim 1, wherein the global importance score of the recipient is set to a predetermined value.

7. The method of claim 1, wherein the global importance score of the recipient is based upon the determined measure of importance of the sender to the recipient, and a global importance score of the sender.

8. The method of claim 1, wherein determining for each of the plurality of senders a global importance score, further comprises for each sender:
    for each recipient of a message from the sender, weighting the determined measure of importance of the sender to each recipient by the recipient's global importance score;
    summing the weighted measures of importance for the sender to a tally for the sender; and
    determining the global measure of importance score of the sender from tally for the sender.

9. The method of claim 8, wherein the global measure of importance score is a percentile of the tally for the sender with respect to the tally for other senders.

10. A system for scoring messages exchanged over a network, the system comprising:
    a ranking server configured to:
        receive information identifying messages interactions of a recipient for a plurality of messages from a plurality of senders;
        determine for each of the senders, a measure of importance of the sender to the recipient, based upon the gathered interactions;
        determine for each of the plurality of senders a global importance score, wherein the global importance score of each sender is based upon the determined measure of importance of the sender to each of the plurality of recipients of messages from the sender, the recipient one of the plurality of recipients, and a global importance score of each of the plurality of recipients of messages from the sender; and
        store the global importance score of each sender in association with sender information.

11. The system of claim 10, wherein the ranking server is configured to:
    associate with a message a rank, the message to at least the recipient, the message from a sender, the sender one of the plurality of senders, the rank based upon the determined global importance score of the sender.

12. The system of claim 10, further comprising:
    a plug-in for an email client, the plug-in stored in a non-transitory computer readable storage medium, the plug-in configured to identify message interactions of a recipient for a plurality of messages, the messages from a plurality of senders.

13. The system of claim 10, wherein the plug-in for an email client identifies at least one of:
    the responses of the recipient to a plurality of messages from a plurality of senders;
    feedback from the recipient on the measure of importance of the sender to the recipient;
    feedback from the recipient on the global importance score of the sender; and
    the attributes of the message.

14. The system of claim 10, wherein the ranking server determines the measure of importance of the sender to each recipient based on frequency and recency of the identified message interactions.

15. The system of claim 10, wherein the ranking server sets the measure of importance of the sender to a predetermined value.

16. The system of claim 10, wherein the ranking server sets the global importance score of the recipient to a predetermined value.

17. The system of claim 10, wherein the ranking server determines the global importance score of the recipient based upon the measure of importance of the sender, and a global importance score of the sender.

18. The system of claim 10, wherein determining for each of the plurality of senders a global importance score, further comprises for each sender:
    for each recipient of a message from the sender, weighting the determined measure of importance of the sender to each recipient by the recipient's global importance score;
    summing the weighted measures of importance for the sender to a tally for the sender; and
    determining the global measure of importance score of the sender from tally for the sender.

19. The system of claim 18, wherein the global measure of importance score is a percentile of the tally for the sender with respect to the tally for other senders.

20. A computer program product for use in conjunction with a computer system, the computer program product comprising a non-transitory computer readable storage medium and a computer program embedded therein, the computer program comprising:
    a plug-in for an email client configured for:
        identifying message interactions of a recipient for a plurality of messages, the messages from a plurality of senders;
        associating a message with a rank, the message from one of the senders sent to at least one of the recipients, the rank provided from a ranking server, wherein the rank is determined based on a global importance score for each of the plurality of senders, wherein the global importance score of the sender is based upon a measure of importance of each of the plurality of senders to each of the plurality of recipients of messages from each of the plurality of senders, and a global importance score of the recipient; and
        provide the message with the associated rank to the email client for presentation to the recipient.

21. A computer program product for use in conjunction with a computer system, the computer program product comprising a non-transitory computer readable storage medium and a computer program embedded therein, the computer program comprising:
    a ranking server configured for:
        receiving identified message interactions of a plurality of recipients for a plurality of messages, the messages from a plurality of senders; and
        determining a rank for a message, the message from a sender destined for a recipient, wherein the ranking server is configured to determine the rank based on a global importance score for each of the plurality of senders, wherein the global importance score of the sender is based upon a measure of importance of each of the plurality of senders to each of the plurality of recipients of messages from each of the plurality of senders, and a global importance score of the recipient.

* * * * *